United States Patent
Kirtley et al.

(10) Patent No.: US 9,816,388 B1
(45) Date of Patent: Nov. 14, 2017

(54) SEAL IN A GAS TURBINE ENGINE HAVING A SHIM BASE AND A HONEYCOMB STRUCTURE WITH A NUMBER OF CAVITIES FORMED THEREIN

(71) Applicant: General Electric Company, Schenectady, NY (US)

(72) Inventors: Kevin Richard Kirtley, Greenville, SC (US); Ibrahim Sezer, Greenville, SC (US); Benjamin P. Lacy, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/272,864

(22) Filed: Sep. 22, 2016

(51) Int. Cl.
| | | |
|---|---|---|
| *F01D 11/08* | (2006.01) | |
| *F01D 11/02* | (2006.01) | |
| *F16J 15/447* | (2006.01) | |
| *B33Y 80/00* | (2015.01) | |

(52) U.S. Cl.
CPC .............. *F01D 11/02* (2013.01); *B33Y 80/00* (2014.12); *F16J 15/447* (2013.01); *F05D 2220/32* (2013.01); *F05D 2230/00* (2013.01); *F05D 2250/121* (2013.01); *F05D 2250/132* (2013.01); *F05D 2250/141* (2013.01); *F05D 2250/283* (2013.01); *F05D 2260/20* (2013.01)

(58) Field of Classification Search
CPC .......... F01D 11/02; F01D 11/08; F01D 11/12; F01D 11/127; F05D 2250/283
See application file for complete search history.

(56) References Cited

U.S. PATENT DOCUMENTS

| | | | |
|---|---|---|---|
| 3,071,853 A * | 1/1963 | Price | B21D 47/00 228/181 |
| 3,916,054 A * | 10/1975 | Long | B32B 3/12 228/106 |
| 5,224,644 A | 7/1993 | Campbell | |
| 6,251,494 B1 * | 6/2001 | Schreiber | F01D 11/127 228/181 |
| 8,142,874 B1 * | 3/2012 | Jefferson | B64G 1/22 428/116 |
| 8,678,754 B2 | 3/2014 | Morgan et al. | |
| 2009/0148278 A1 * | 6/2009 | Allen | C23C 26/00 415/173.4 |
| 2013/0315718 A1 * | 11/2013 | Parker | F02B 37/22 415/157 |
| 2014/0020403 A1 * | 1/2014 | Tsukuda | F01D 11/001 60/805 |
| 2016/0215646 A1 * | 7/2016 | Gonyou | F01D 11/025 |

* cited by examiner

*Primary Examiner* — Gilbert Lee
(74) *Attorney, Agent, or Firm* — Eversheds Sutherland (US) LLP

(57) ABSTRACT

A seal in a gas turbine engine includes a shim base and a honeycomb structure having a number of cavities are formed as a single unitary structure using additive manufacturing.

16 Claims, 2 Drawing Sheets

SEAL IN A GAS TURBINE ENGINE HAVING A SHIM BASE AND A HONEYCOMB STRUCTURE WITH A NUMBER OF CAVITIES FORMED THEREIN

FIELD OF THE DISCLOSURE

The disclosure generally relates to gas turbine engine seals and more particularly relates to a seal in a gas turbine engine having a shim base and a honeycomb structure with a number of cavities therein formed as a single unitary structure with the shim base using additive manufacturing.

BACKGROUND

Sealing slots between gas turbine engine components often have skews, offsets, imperfections, and/or flaws that may prevent effective sealing with a rigid seal between the components. Thin shims may be versatile enough to form a seal between the components regardless of the skews and offsets but tend to get crushed during assembly. Cloth seals are flexible and crush resistant but may not seal as well as a single shim. Laminate seals, which are layers of shim mechanically bonded, may provide a sufficient seal between components but can still get crushed and deformed during assembly. Accordingly, there is a need for a seal assembly in a gas turbine engine that can meet a variety of sealing, crush resistance, and flexibility requirements.

BRIEF DESCRIPTION

Some or all of the above needs and/or problems may be addressed by certain embodiments of the seal disclosed herein. According to an embodiment, a seal in a gas turbine engine includes a shim base and a number of adjoining cavities. In some instances, the shim base and the number of adjoining cavities are formed as a single unitary structure using additive manufacturing.

Other features and aspects of the disclosure will be apparent or will become apparent to one with skill in the art upon examination of the following figures and the detailed description. All other features and aspects, as well as other system, method, and assembly embodiments, are intended to be included within the description and are intended to be within the scope of the accompanying claims.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
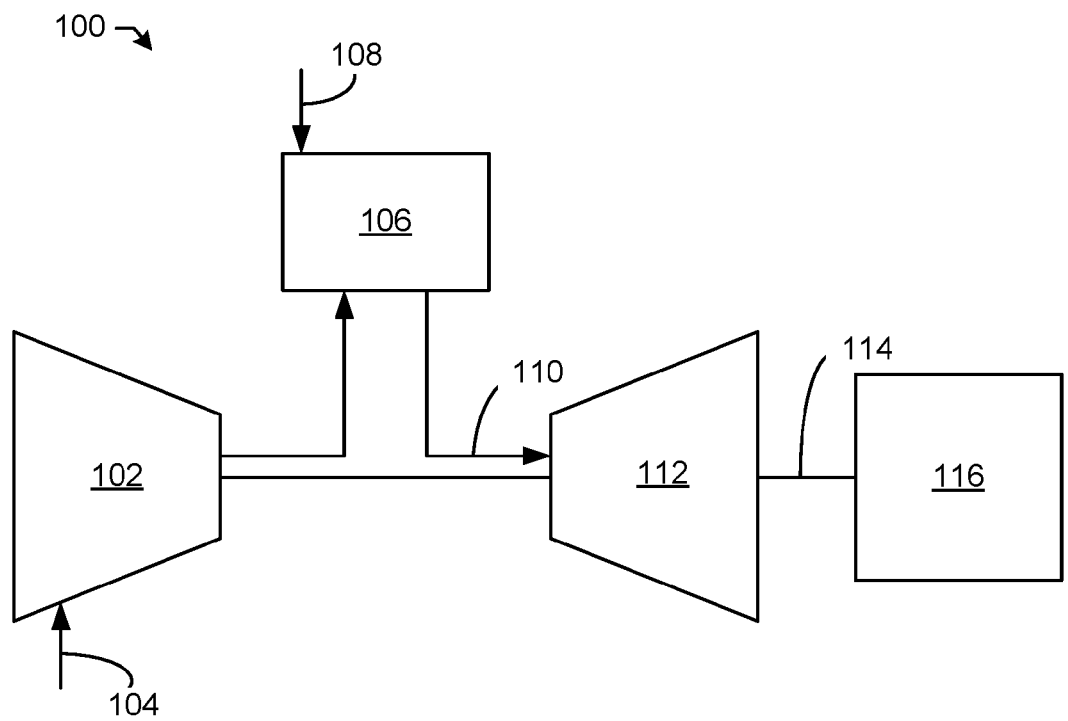
FIG. 1 depicts a gas turbine engine in accordance with one or more embodiments of the disclosure.

Described below are embodiments of a seal (as well as individual components of the seal) that can be used to form a seal between components in a gas turbine engine. Methods of making and using the seal are also disclosed. The seal may include a shim base and a honeycomb structure with a number of cavities therein formed as a single unitary structure with the shim base. For example, the shim base and the honeycomb structure with the adjacent cavities may be formed as a single unitary structure using additive manufacturing. Example additive manufacturing techniques may include 3D printing or the like. Direct metal laser melting (DMLM) is one example manufacturing technique that may be used to manufacture the seal. Powder fusion welding (sometimes called laser metal deposition) is another example manufacturing technique that could be used to create the cavities. Binder Jet is another example manufacturing technique that could be used to create the cavities. The seal could be a hybrid manufactured seal using shim stock on which the cavities are additively built. Any manufacturing technique may be used. In some instances, the shim base and the honeycomb structure can be manufactured separately and thereafter affixed to each other. That is, various components of the seal could be built in pieces and thereafter assembled together by brazing, welding, or the like.

The term "honeycomb" may be used to describe the adjacent cavities structure, although the cavities may be any size, shape, or configuration. Accordingly, the term "honeycomb" is not intended to limit the shape of the cavities to any particular structure, such as a hexagon or the like, although in some instances the cavities may be hexagonal. Furthermore, the orientation of the honeycomb structure and the cavities formed thereby may be any direction relative to the shim.

In some instances, each of the cavities may be occluded (i.e., closed off) at different heights. For example, each of the cavities may be occluded at different staggered and non-uniform heights. In other instances, only some of the cavities may be occluded. In yet other instances, all of the cavities may be occluded at the same height. In still other instances, some of the cavities may be occluded at the same or different heights while other may not be occluded. That is, only a portion of the cavities may be occluded. In some instances, the cavities may be porous cavities, some or all of which may be open-ended or occluded. In certain embodiments, the shim base may include a number of shim bases that are disposed on alternating ends of adjacent cavities.

As noted above, the cavities comprise a number of different shaped porous cavities, some or all of which may be open-ended or occluded. The cavities may vary in size, shape, and configuration. That is, some of the cavities may be larger and/or different shapes than others. In other instances, the cavities may all be the same uniform size and/or shape. In some instances, the cavities are formed by a number of stiffeners, channels, ribs, circles, squares, ovals, hexagons, or combinations thereof. Any number of structures which form a honeycomb of cavities may be used.

To facilitate forming a seal between various components in a gas turbine engine, the shim base and the cavities may be flexible. In addition, the shim base and the cavities may be crush resistant. The honeycomb structure of the seal may provide flexibility and crush resistance. In this manner, the shim base may provide a sealing surface while the honeycomb structure provides flexibility and crush resistance in the longitudinal and torsional directions. The thickness of the seal can be increased without loss of flexibility in the longitudinal and torsional directions. Bias and anisotropic structures can be incorporated into the seal to tailor the sealing and flexibility of the seal. In some instances, a taper can be added to the periphery of the seal for assembly self-alignment. In addition, the seal can also include a top shim stock in addition to the shim base. The top shim stock can be located on the opposite side of the cavities from the shim base to make the seal independent of assembly direction (e.g., the seal can be installed with either side up). Moreover, cooling features, such as channels, holes, or the like, on the non-sealing side of the seal can be added for a cooled seal. In one example embodiment, coolant may be provided to and flow through the cavities of the honeycomb structure in order to cool the seal. For example, the cavities can be interconnected by openings to allow cooling flow to enter into one or more cavities from the high pressure side and flow from cavity to cavity in a straight or tortuous path as desired to provide cooling to the seal. The cooling flow through the cavities may exit from one or more cavities from a lower pressure region in the seal. The seal enables the reduction of leakage flow in a gas turbine engine and improves efficiency in generating power. The seal provides a means to ensure deterministic loading of individual sealing components.

Turning now to the drawings, FIG. 1 depicts a schematic view of gas turbine engine 100 as may be used herein. The gas turbine engine 100 may include a compressor 102. The compressor 102 compresses an incoming flow of air 104. The compressor 102 delivers the compressed flow of air 104 to a combustor 106. The combustor 106 mixes the compressed flow of air 104 with a compressed flow of fuel 108 and ignites the mixture to create a flow of combustion gases 110. Although only a single combustor 106 is shown, the gas turbine engine 100 may include any number of combustors 106. The flow of combustion gases 110 is in turn delivered to a downstream turbine 112. The flow of combustion gases 110 drives the turbine 112 to produce mechanical work. The mechanical work produced in the turbine 112 drives the compressor 102 via a shaft 114 and an external load 116, such as an electrical generator or the like.

The gas turbine engine 100 may use natural gas, various types of syngas, and/or other types of fuels. The gas turbine engine 100 may be any one of a number of different gas turbine engines such as those offered by General Electric Company of Schenectady, N.Y. and the like. The gas turbine engine 100 may have different configurations and may use other types of components. Other types of gas turbine engines also may be used herein. Multiple gas turbine engines, other types of turbines, and other types of power generation equipment also may be used herein together.

Figure 2:
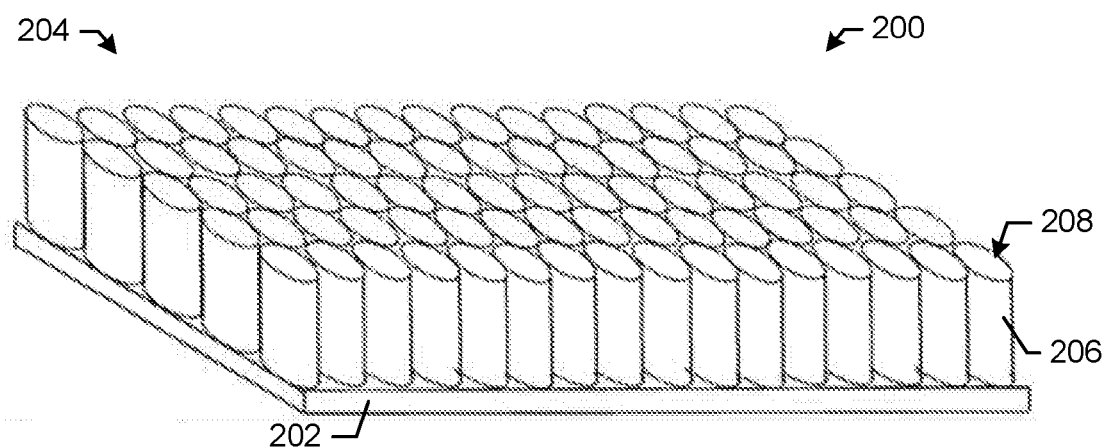
FIG. 2 depicts a seal in accordance with one or more embodiments of the disclosure.

FIG. 2 depicts a seal 200. The seal 200 may form a seal between two components in the gas turbine engine 100 of FIG. 1. For example, the seal 200 may form a seal between a high pressure (HP) side and a low pressure (LP) side of the seal 200. The seal 200 may include a shim base 202. The shim base 202 may be any size, shape, or configuration. The shim base 202 may be a metal, ceramic, or plastic. Any material may be used.

The seal 200 also may include a honeycomb-like structure of cavities 204. Any number of cavities 204 may be used. The cavities 204 may be any size, shape, or configuration. The cavities 204 may be a metal, ceramic, or plastic. Any material may be used. The cavities 204 may be the same or different material than the shim base 202. The cavities 204 may form a single honeycomb-like structure. In some instances, each of the cavities may include an outer wall 206 forming a chamber 208 therein. The outer wall 206 may be shared between the cavities 204. The shim base 202 and the cavities 204 may be formed as a single unitary structure using additive manufacturing, such as 3D printing (e.g., DMLM). Any manufacturing technique may be used.

Figure 3:
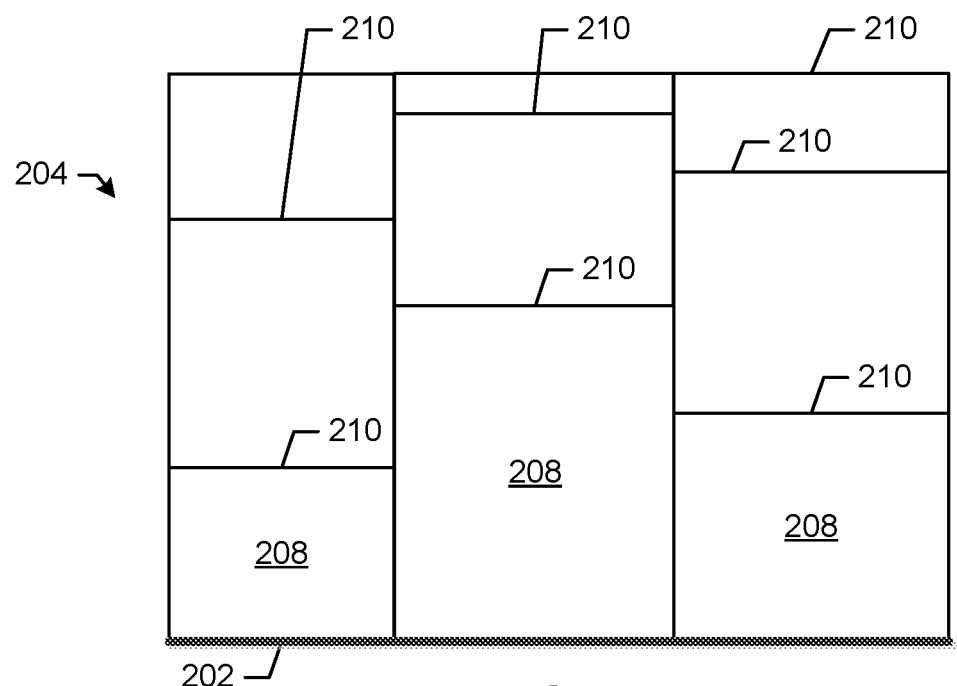
FIG. 3 depicts a seal in accordance with one or more embodiments of the disclosure.

In certain embodiments, as depicted in FIG. 3, some or all of the cavities 204 may be occluded (i.e., closed off) at different heights. That is, some or all of the cavities 204 may include a platform 210 closing off the chamber 208. The platform 210 may be located opposite the shim base 202 within the chamber 208 or at an end of the chamber 208. In some instances, some or all of the cavities 204 may include multiple platforms 210. In one embodiment, each of the cavities 204 may be occluded at different staggered and non-uniform heights. In other instances, only some of the cavities 204 may be occluded. In yet other instances, all of the cavities 204 may be occluded at the same height. In still other instances, some of the cavities 204 may be occluded at the same or different heights while other may not be occluded. That is, only a portion of the cavities 204 may be occluded. In some instances, the cavities 204 may be porous cavities, some or all of which may be open-ended or occluded. The size, shape, and configuration of the cavities 204 may vary.

Figure 4:
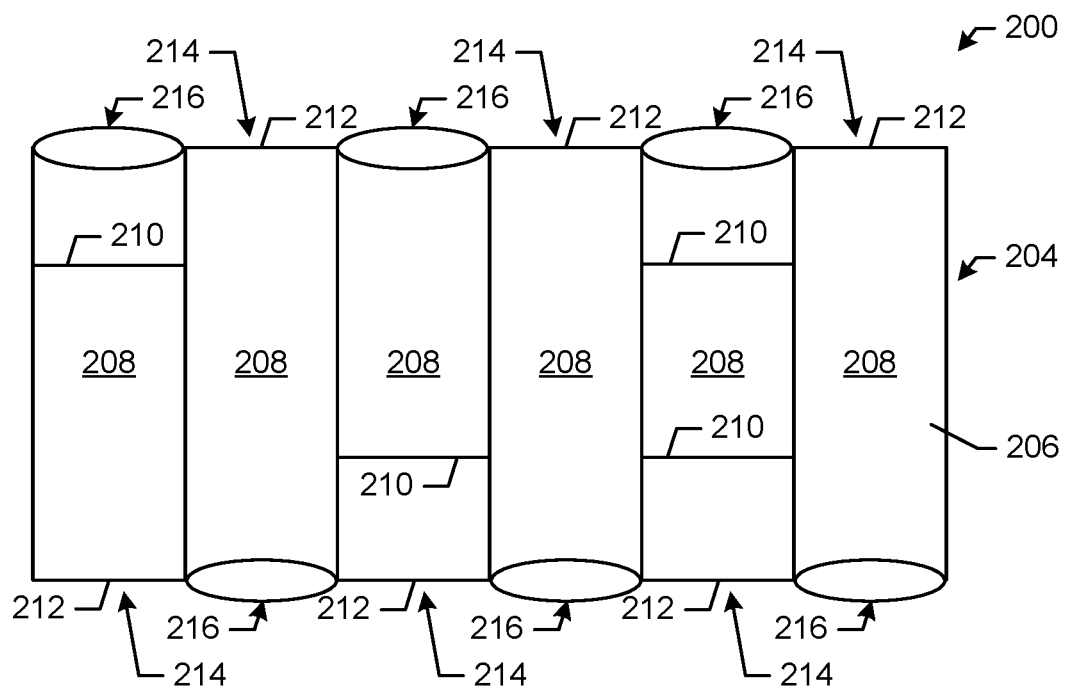
FIG. 4 depicts a seal in accordance with one or more embodiments of the disclosure.

In another example embodiment, as depicted in FIG. 4, a number of shim bases 212 may be used. The shim bases 212 may be disposed on alternating ends of adjacent cavities 204. That is, each chamber 208 may be closed off on one end 214 and open on the opposite end 216. The open 216 and closed 214 ends may alternate. The alternating shim bases 212 ensure that the seal is flexible. In some instances, one or more platforms 210 may be disposed within the chambers 208 of some or all of the cavities 204 to occlude all or a portion of the cavities 204. The alternating shim bases 212 may provide a seal between the HP side and the LP side of the seal 200. In addition, because the shim bases 212 alternative from side to side about the cavities 204, the seal 200 is flexible. The cavities 204 also insure that the seal is crush resistant.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A seal in a gas turbine engine, the seal comprising:
   a shim base; and
   a honeycomb structure with a plurality of cavities,
      wherein the honeycomb structure and the shim base
         comprise a single unitary structure, wherein the shim base forms a seal and the honeycomb structure provides flexibility and crush resistance in longitudinal and torsional directions, wherein at least a portion of the plurality of cavities are closed off by a plurality of platforms opposite the shim base at different heights within the plurality of cavities.

2. The seal of claim 1, wherein the shim base and the plurality of cavities are formed as a single unitary structure using additive manufacturing.

3. The seal of claim 1, wherein the plurality of cavities comprises a plurality of porous cavities.

4. The seal of claim 1, wherein the plurality of cavities comprises a plurality of different shaped porous cavities.

5. The seal of claim 1, wherein the plurality of cavities is formed by a plurality of stiffeners, channels, ribs, circles, squares, ovals, hexagons, or combinations thereof.

6. The seal of claim 1, wherein the shim base and the plurality of cavities are flexible.

7. The seal of claim 1, wherein the shim base and the plurality of cavities are crush resistant.

8. The seal of claim 1, wherein the shim base comprises a plurality of shim bases that are each disposed on alternating ends of adjacent cavities of the plurality of cavities.

9. A method of creating a seal in a gas turbine engine, the method comprising:
   forming a shim base;
   forming a plurality of cavities on the shim base as a single unitary structure with the shim base;
   forming a seal with the shim base;
   providing flexibility and crush resistance in longitudinal and torsional directions with the plurality of cavities; and
   closing off at least a portion of the plurality of cavities by a plurality of platforms opposite the shim base at different heights within the plurality of cavities.

10. The method of claim 9, further comprising forming the shim base and the plurality of cavities as a single unitary structure using additive manufacturing.

11. The seal of claim 9, further comprising forming the plurality of cavities as porous cavities.

12. The seal of claim 9, further comprising flowing a coolant through the plurality of cavities to cool the seal.

13. The seal of claim 12, wherein the plurality of cavities comprises a plurality of different shaped porous cavities.

14. The seal of claim 12, wherein the plurality of cavities is formed by a plurality of stiffeners, channels, ribs, circles, squares, ovals, hexagons, or combinations thereof.

15. The seal of claim 12, wherein the shim base comprises a plurality of shim bases that are disposed on alternating ends of adjacent cavities of the plurality of cavities.

16. A seal in a gas turbine engine, the seal comprising:
   a shim base; and
   a plurality of cavities,
   wherein the shim base and the plurality of cavities comprise a single unitary structure,
   wherein the shim base forms a seal and the honeycomb structure provides flexibility and crush resistance in longitudinal and torsional directions,
   wherein at least a portion of the plurality of cavities are closed off by a plurality of platforms opposite the shim base at different heights within the plurality of cavities.

* * * * *